United States Patent
Beauchemin

(12) 
(10) Patent No.: US 6,237,476 B1
(45) Date of Patent: May 29, 2001

(54) NUTCRACKER

(76) Inventor: Jean Beauchemin, 5042, avenue St-Clair, Niagara Fall, Ontario (CA), L2E 3T7

( * ) Notice: Subject to any disclaimer, the term of this patent is extended or adjusted under 35 U.S.C. 154(b) by 0 days.

(21) Appl. No.: 09/541,265

(22) Filed: Apr. 3, 2000

Related U.S. Application Data

(63) Continuation-in-part of application No. 09/320,070, filed on May 26, 1999, now abandoned.
(60) Provisional application No. 60/086,900, filed on May 27, 1998.

(51) Int. Cl.⁷ .................................................... A23N 5/00
(52) U.S. Cl. ................... 99/571; 99/568; 99/572; 99/577; 99/579; 99/581; 30/120.2
(58) Field of Search ............... 99/495, 537, 538, 99/568–582; 30/120.1, 120.2, 120.3, 120.5; 426/481, 482

(56) References Cited

U.S. PATENT DOCUMENTS

| 699,529 | * | 5/1902 | Hutchinson | 99/577 |
| 707,997 | * | 8/1902 | Wickstrom | 99/577 |
| 2,656,866 | * | 10/1953 | Rumsey | 99/578 |
| 3,721,180 | * | 3/1973 | Strang | 99/571 |
| 5,333,384 | * | 8/1994 | Graves | 30/120.2 |

FOREIGN PATENT DOCUMENTS

3002242 * 7/1981 (DE) ................................. 99/571

* cited by examiner

*Primary Examiner*—Timothy F. Simone
(74) *Attorney, Agent, or Firm*—Eric Fincham

(57) ABSTRACT

A novelty nutcracker device which comprises a tubular housing having a side wall thereby defining an elongated passageway, and a first end cap removably connected at a first end of the passageway, a reciprocally moveable impact member mounted within the elongated passageway, a handle connected to the impact member, the impact member being biased towards the first end cap, and an opening in the side wall to permit the insertion of a nut to be cracked therein. The device is preferably packaged in an exterior envelope having the form of a sports article or an animal character.

7 Claims, 4 Drawing Sheets

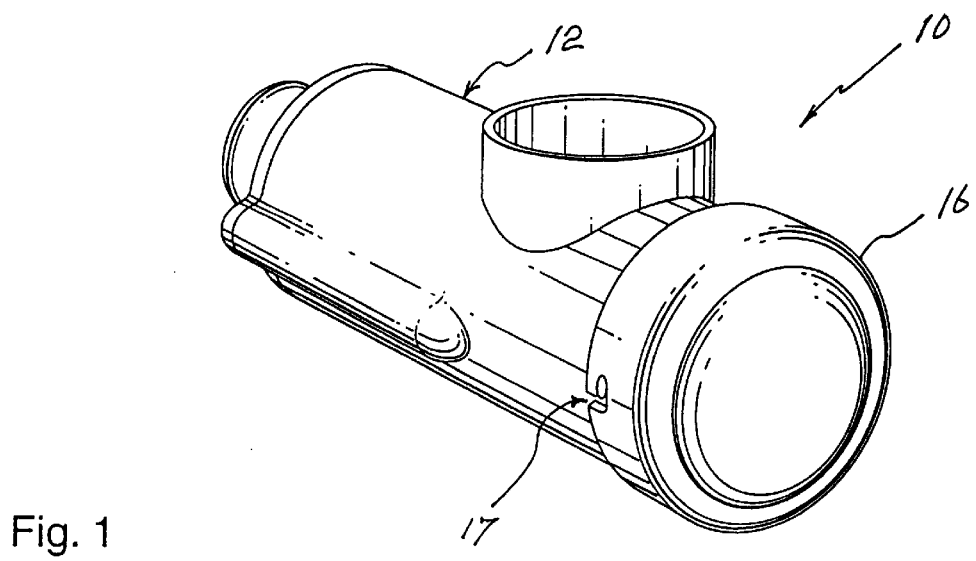
Fig. 1
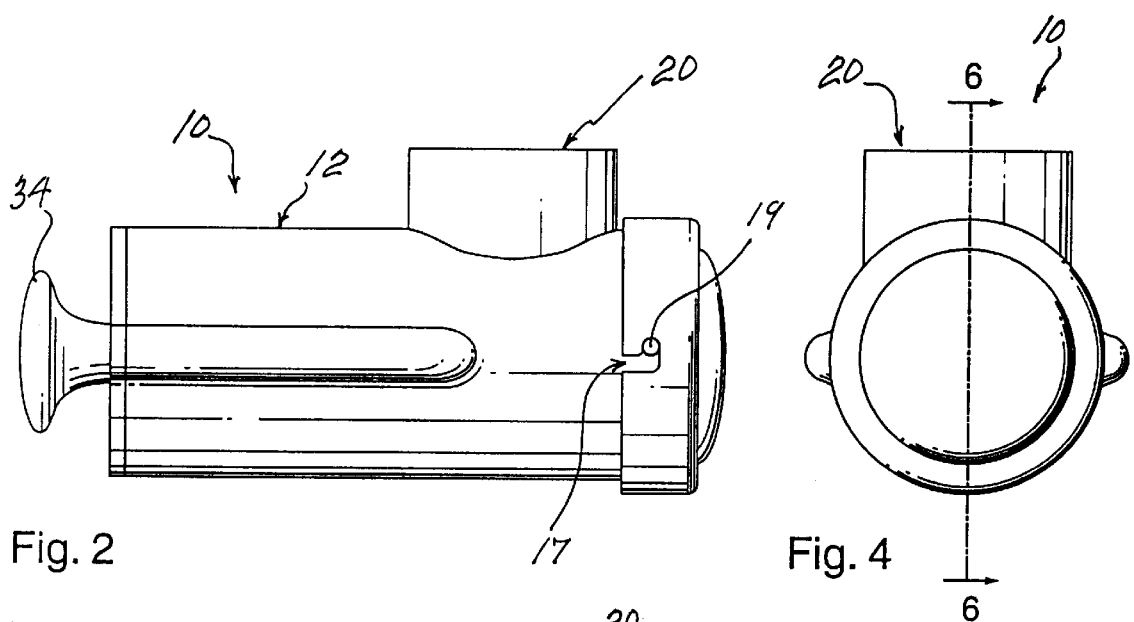
Fig. 2
Fig. 4
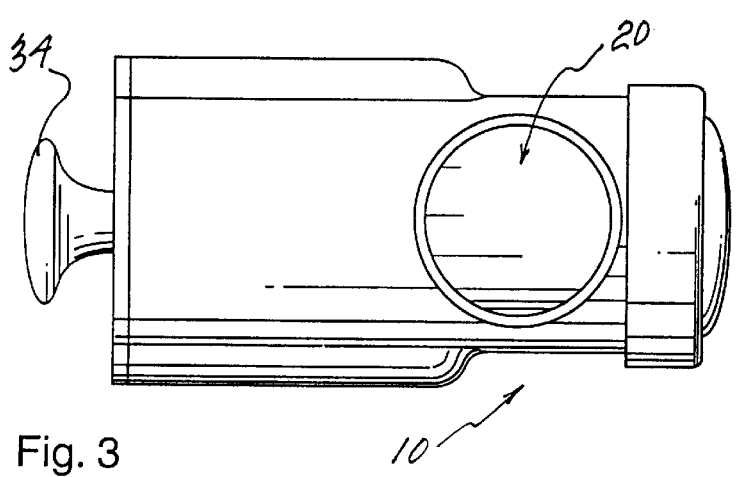
Fig. 3

NUTCRACKER

The present application is a continuation-in-part of application Ser. No. 09/320,070 filed May 26, 1999 now abandoned. This application claims the benefit of Provisional Application No. 60/086,900 filed May 27, 1998.

BACKGROUND OF THE INVENTION

The present invention relates to nutcrackers which may be housed in different types of figures.

There are a number of different types of nutcrackers which have been proposed in the art. Generally, they are divided between what may be termed manually operated nutcrackers and automatic types.

In the automatic nutcracking apparatuses, normally the apparatus is actuated by means of a switch which is operative only when various safety shields and the like are in place. Although such devices are known, it has been suggested that difficulty has been experienced in quickly and simply adjusting the apparatus to accommodate various sizes and shapes of nut. In addition, there is always the danger to the operator or people surrounding the device in the projection of portions of the shell of the nut during the cracking process.

Manually operated nutcrackers are also known. However, many of them are relatively complicated devices which are not readily adjustable and adaptable for different sizes and types of nut.

SUMMARY OF THE INVENTION

It is therefore an object of the present invention to provide a simple yet effective nutcracking device.

It is a further object of the present invention to provide a nutcracking device in the form of a novelty item which may assume different configurations.

It is a further object of the present invention to provide a nutcracking device which is relatively inexpensive to manufacture and assemble.

According to one aspect of the present invention, there is provided a nutcracking device comprising a tubular housing having a side wall, an elongated passageway defined by the side wall, the elongated passageway having first and second open ends, first and second end caps located at each of the first and second open ends, an aperture extending through the side wall and communicating with the elongated passageway to thereby define a nut receiving opening, a reciprocally moveable impact member mounted within the elongated passageway, a shaft having a first end thereof connected to the reciprocally moveable impact member, the shaft extending through the second end cap, handle means connected to a second end of the shaft, and resilient biasing means biasing the impact member towards the first end of the elongated passageway.

The nutcracking device of the present invention may be packaged as a novelty item having different configurations. However, in all instances, there is provided the elongated passageway and the nut receiving opening. Access is provided to the first end and the nut receiving opening with the openings being incorporated in the novelty item which may take the form of different types of animals or inanimate objects.

BRIEF DESCRIPTION OF THE DRAWINGS

Having thus generally described the invention, reference will be made to the accompanying drawings illustrating embodiments thereof, in which:

FIG. 1 is a perspective view of the nutcracking mechanism utilized in the present invention;

FIG. 2 is a side elevational view thereof;

FIG. 3 is a top plan view thereof;

FIG. 4 is an end elevational view thereof;

DESCRIPTION OF THE PREFERRED EMBODIMENTS

Figure 5:
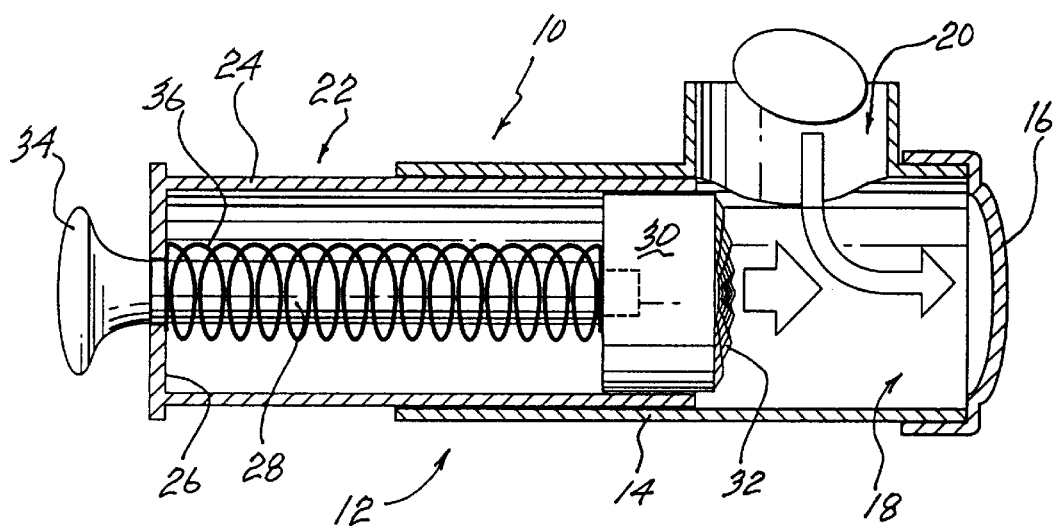
FIG. 5 is a side sectional view of the nutcracker mechanism showing insertion of a nut therein.

Referring to the drawings in greater detail and by reference characters thereto, there is illustrated a nutcracker mechanism which is generally designated by reference numeral 10.

Nutcracker mechanism 10 includes an outer housing 12 which, in the illustrated configuration, is cylindrical and defined by a cylindrical side wall 14. At a first end, there is provided a cap 16 which is provided with an L-shaped slot 17 such that the cap may be retained by an outwardly extending pin 19 on outer housing 12. An inlet 20 is provided in cylindrical side wall 14 such that a nut 21 may be placed within a chamber 18 which is defined within outer housing 12.

There is also provided an inner housing 22 which is slidably engageable within outer housing 12. Inner housing 22 includes a cylindrical side wall 24 and an end wall 26.

The impact mechanism for impacting the nut includes a shaft 28 having an impact head 30 mounted thereon. Impact head 30 has a somewhat roughened impact surface 32.

At the other end of shaft 28, there is provided a handle 34. Helical spring 36 extends about shaft 28 and abuts end wall 26 and impact head 30.

As may be best seen in FIGS. 7 to 11, outer housing 12 has, on diametrically opposed sides, outward bulges 40 and 42 to define cavities 40' and 42' respectively. Mounted within cavity 40 is a spring member 44 having a first end thereof attached to end wall 26 at point 46 with the other end being attached as designated by reference numeral 48 to housing 12. Similarly, within cavity 42' there is provided a spring 44' similarly attached. In operation, and as may best be seen in FIGS. 5, 6, 9, 10 and 11, handle 34 is pulled rearwardly such that inner housing 22 also moves rearwardly and springs 44 and 44' are in their extended position.

Figure 6:
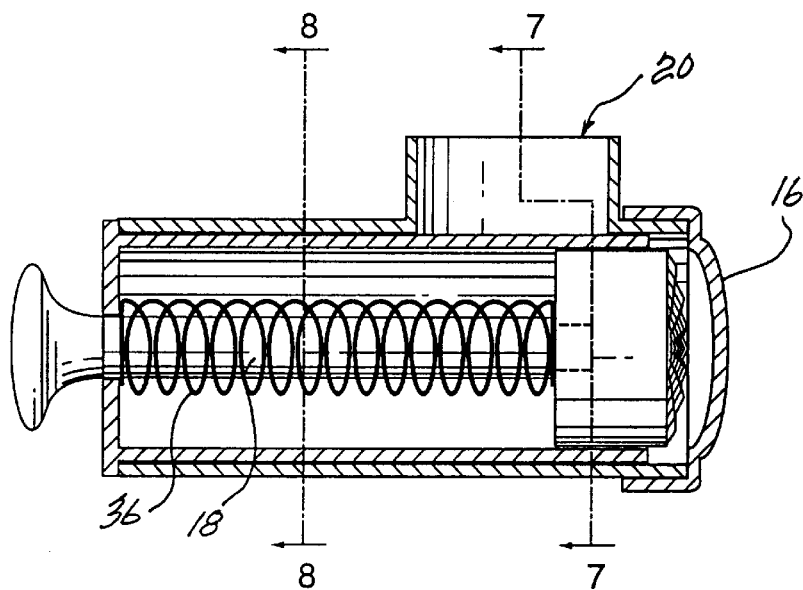
FIG. 6 is a side sectional view taken along the line 6—6 of FIG. 4.
Figures 7, 8:
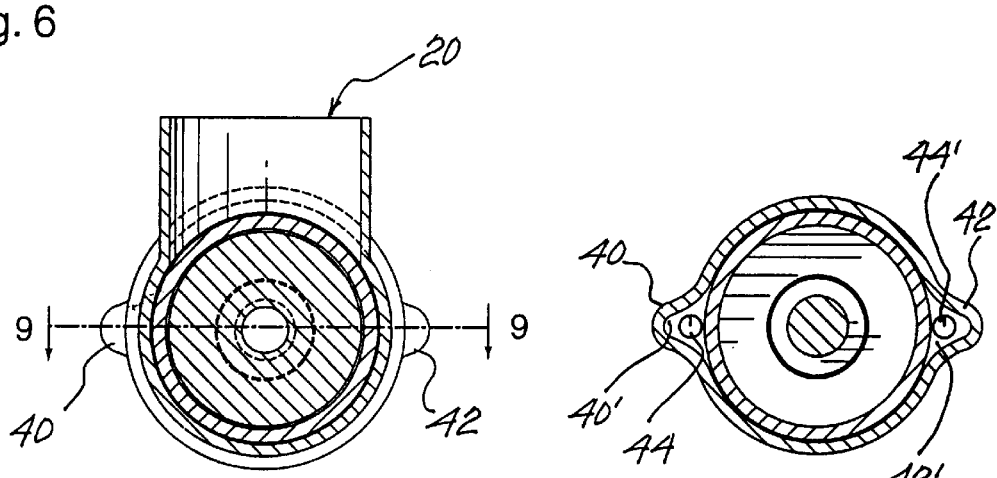
FIG. 7 is a sectional view taken along the line 7—7 of FIG. 6.
FIG. 8 is a sectional view taken along the line 8—8 of FIG. 6.
Figure 9:
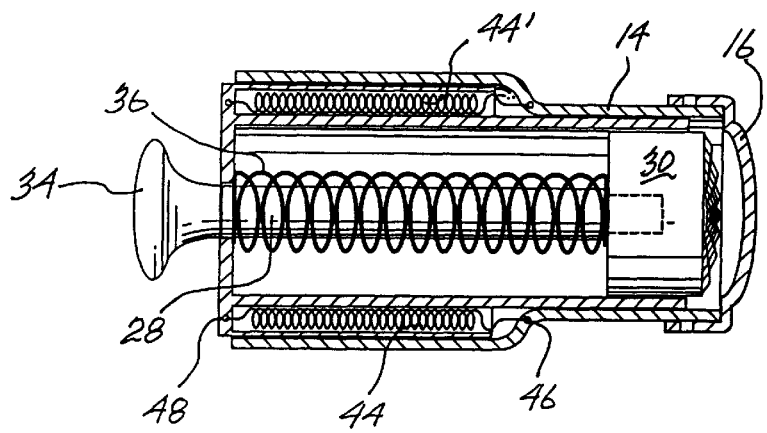
FIG. 9 is a sectional view taken along the line 9—9 of FIG. 7.
Figure 10:
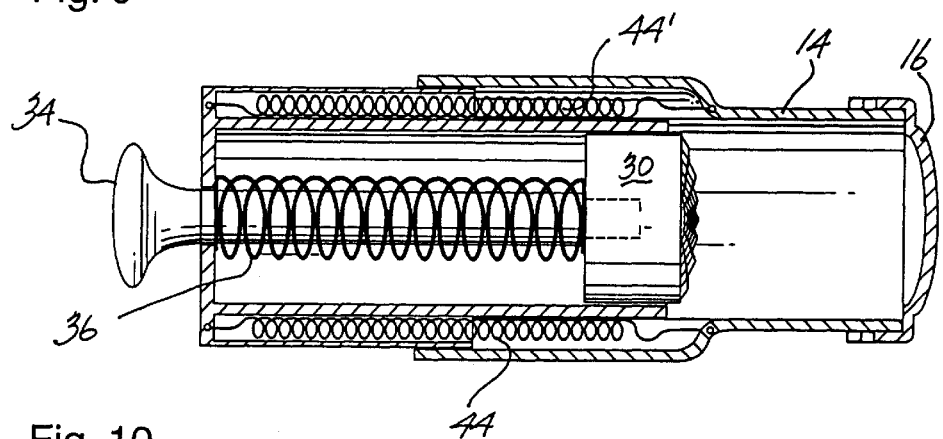
FIG. 10 is a view similar to FIG. 9 showing the inner impact mechanism in a partially retracted position.
Figure 11:
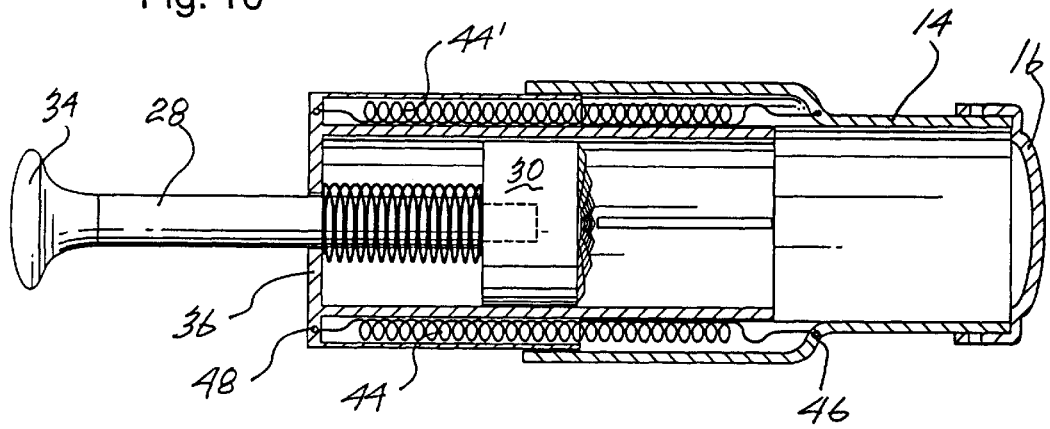
FIG. 11 is a view similar to FIG. 10 showing the impact mechanism in a fully retracted position.

This permits the placement of nut 21 within chamber 18. A further rearward movement by pulling handle 34 will cause a compression of spring 36. Subsequently, the release of the handle will cause impact head 30 to the closed position as shown in FIG. 6 thus cracking the nut therein.

Figure 12:
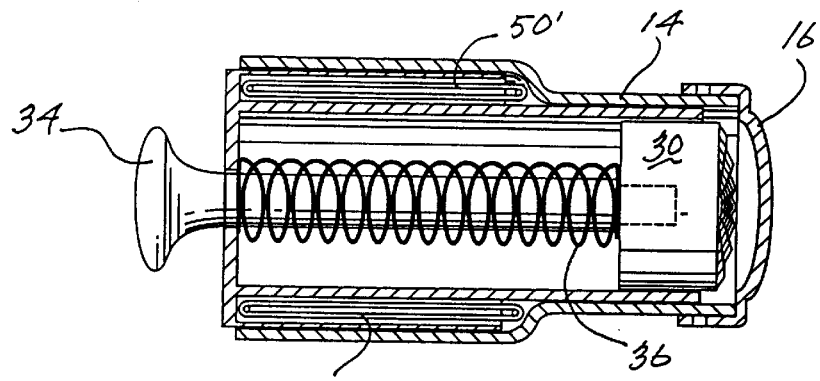
FIG. 12 is a cross sectional view of a further embodiment of the present invention.

In the embodiment of FIG. 12, in lieu of springs 44 and 44', there is provided a pair of elastic members 50 and 50'.

Figure 13:
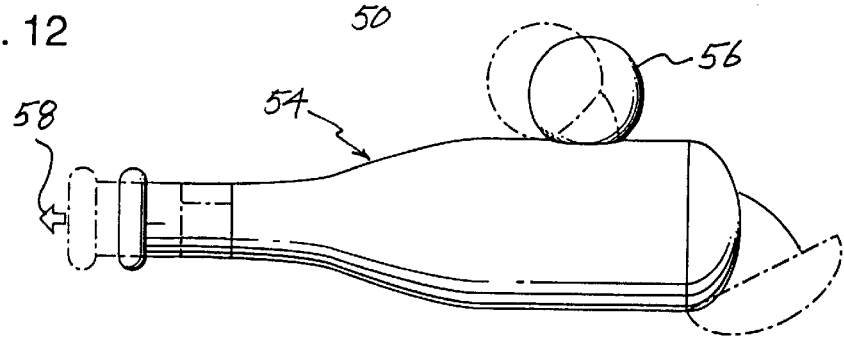
FIG. 13 is a side view of a first packaging arrangement for the nutcracker mechanism.

The nutcracker mechanism of the present invention is housed in a number of different exterior dressings. Thus, as shown in FIG. 13, in a first embodiment, there is provided a baseball bat generally designated by reference numeral 54 extending about outer housing 12. A cover designed as a ball 56 provides access to inlet 20 to chamber 18. The end of the baseball bat is designed as the cap 16. Operation of the nutcracker mechanism is achieved by pulling the handle end of the baseball bat as indicated by arrow 58.

Figure 14:
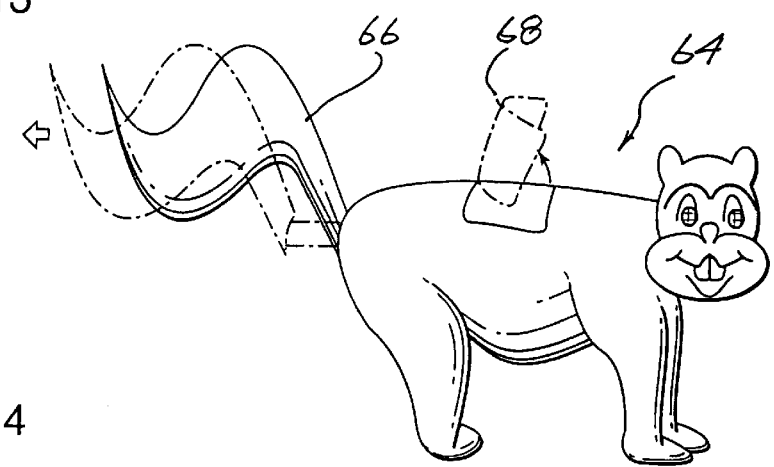
FIG. 14 is a side view of a further packaging arrangement for the nutcracker mechanism.

In the embodiment of FIG. 14, there is provided an animal figure generally designated by reference numeral 64. In this embodiment, tail 66 functions as the handle 34. A cover 68 is provided while the head portion is moveable to permit removal of the nut after cracking.

Figure 15:
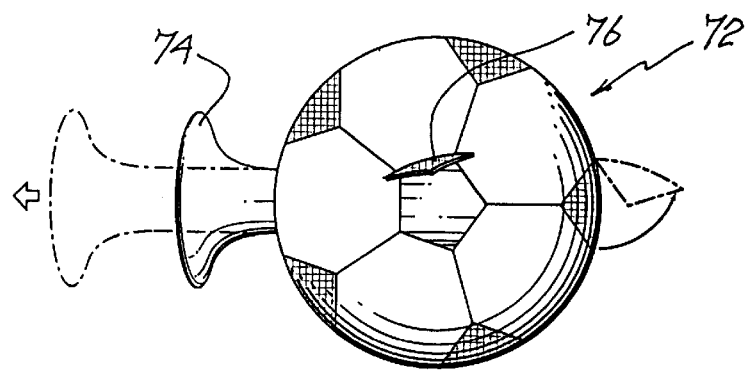
FIG. 15 is a side view of a further packaging arrangement for the nutcracker mechanism of the present invention.

In the embodiment of FIG. 15, there is provided a soccer ball 72 which may be stood on a stand 74 which functions as the handle. A panel 76 of the cover may be removed to provide access to place the nut in the chamber 18.

It will be understood that the above described embodiments are for purposes of illustration only and that changes and modifications may be made thereto without departing from the spirit and scope of the invention.

I claim:

1. A nut cracking device comprising a tubular housing having a side wall, an elongated passageway defined by said side wall, said elongated passageway having first and second open ends, a first end cap removably connected to said tubular housing at said first open end, a second end cap at said second open end, an aperture extending through said side wall and communicating with said elongated passageway to thereby define a nut receiving opening, a reciprocally moveable impact member mounted within said elongated passageway, a shaft having a first end thereof connected to said reciprocally moveable impact member, said shaft extending through said second end cap, a handle connected to a second end of said shaft, first and second biasing means biasing said impact member towards said first end, said first biasing means comprising a first spring member about said shaft, said spring member extending between said reciprocally moveable impact member and said second end cap, said second biasing means extending between and connected to said second end cap and said tubular housing.

2. The device of claim 1 wherein said second biasing means comprise second and third spring members, each of said second and third spring members being mounted in a recess formed in said tubular housing, said second and third spring members being mounted in a diametrically opposed relationship.

3. The device of claim 1 wherein said second biasing means comprise first and second elastic members, said first and second elastic members being mounted in diametrically opposed recesses in said tubular housing.

4. The device of claim 1 wherein said tubular housing has an exterior configuration resembling a squirrel.

5. The device of claim 4 wherein said handle forms a tail portion of said squirrel configuration.

6. The device of claim 1 wherein said tubular housing has an exterior configuration of a soccer ball on a stand, said handle being in the form of said stand.

7. The device of claim 1 wherein said tubular housing has an exterior configuration in the form of a baseball bat.

* * * * *